United States Patent [19]

Wagatsuma et al.

[11] 4,018,452
[45] Apr. 19, 1977

[54] TRACTOR-SCRAPER UNITS WITH PUSH-PULL COUPLING INCLUDING TWO-WAY SHOCK ABSORBERS

[75] Inventors: Toshiaki Wagatsuma, Yokohama; Toshitaka Suketomo, Kawasaki; Kouki Yoshida, Kawasaki; Michio Suga, Kawasaki, all of Japan

[73] Assignee: Kabushiki Kaisha Komatsu Seisakusho, Tokyo, Japan

[22] Filed: Mar. 20, 1975

[21] Appl. No.: 560,364

[30] Foreign Application Priority Data

Mar. 22, 1974 Japan .............................. 49-31692

[52] U.S. Cl. .................... 280/481; 280/477; 267/138
[51] Int. Cl.² ........................................ B60D 1/04
[58] Field of Search ............... 172/272, 275, 292; 280/477, 481, 508, 478 R, 483, 484, 485, 486, 487, 491 R, 497; 267/138, 141, 152, 153

[56] References Cited

UNITED STATES PATENTS

| 3,243,203 | 3/1966 | Hermiz et al. | 280/481 |
| 3,547,426 | 12/1970 | Hart et al. | 267/138 |
| 3,606,388 | 9/1971 | Campbell | 280/477 |
| 3,819,206 | 6/1974 | Aarons et al. | 280/487 |

*Primary Examiner*—Richard T. Stouffer
*Attorney, Agent, or Firm*—Oblon, Fisher, Spivak, McClelland & Maier

[57] ABSTRACT

A push-pull coupling for tandem earthmoving scrapers is disclosed wherein the coupling may be rapidly connected or disconnected, thereby permitting the scrapers to operate either in unison or separately. A push block having a pulling hook projecting therefrom is mounted on the rear of a forward scraper, while a push block and a bail for engaging the hook are mounted on the front of a rearward scraper. Furthermore, at least two sets of two-way shock absorber assemblies which can absorb the shock loads caused in the course of the pushing or pulling operations are respectively connected between the push block of the rearward scraper and a reinforcing member fixedly secured to the front thereof.

2 Claims, 6 Drawing Figures

TRACTOR-SCRAPER UNITS WITH PUSH-PULL COUPLING INCLUDING TWO-WAY SHOCK ABSORBERS

BACKGROUND OF THE INVENTION

1. Field of the Invention

This invention relates to an improvement in a coupling for earthmoving scrapers and more particularly to a novel and improved push-pull coupling for tractor-scraper units used for excavation.

2. Description of the Prior Art

In general, the coupling for tractor-scrapers, in particular, tractor-scraper unite used for excavation comprises a push block and a pulling hook which are mounted on the tail end of a forward scraper, and a push block provided with shock absorbing means and a moveable means or bail to engage the pulling hook which are mounted on the front of a rearward scraper.

One type of prior art device employs in principle a shock absorber of the spring type, however, the shock absorber is actuated only when the rearward scraper pushes the forward scraper and cannot effectively absorb or take up the shock taking place when the forward scraper pulls the rearward scraper. Furthermore, such type of coupling of the prior art is disadvantageous in that the above-mentioned components are mounted in such a manner that the tractive power of the forward scraper is transmitted to the tractor frame of the rearward scraper being pulled, and therefore the tractor frame is liable to be deformed.

SUMMARY OF THE INVENTION

The present invention was contemplated in view of the foregoing circumstances, and has for its object to provide a push-pull coupling which can transmit the tractive force of the forward scraper in pulling operation to the axle of the rearward scraper tractor in such a manner that the tractive force is not transmitted to the tractor frame of the rearward scraper and which can absorb the shcok loads caused in the course of a pushing or pulling operation.

According to one aspect of the present invention, there is provided a push-pull coupling for tandem earthmoving scraper units, comprising a push block adapted to be fixedly secured to the tail end portion of a forward scraper and having a pulling hook projecting therefrom, and a push block having means for engaging the pulling hook and adapted to be mounted on the front end of tractor of a rearward scraper, characterized in that said coupling comprises a reinforcing member adapted to be mounted on the front end of said rearward scraper tractor, coupling means adapted to be connected between said reinforcing member and two-way the axle housing of said rearward scraper, and at least two sets of two-way shock absorber assemblies arranged to be connected respectively between the lower part of the push block of the rearward scraper and said reinforcing member.

BRIEF EXPLANATION OF THE DRAWINGS

The above and other objects, features and advantages of the present invention will become apparent from the following description taken in conjunction with the accompanying drawings in which.

Figure 1:
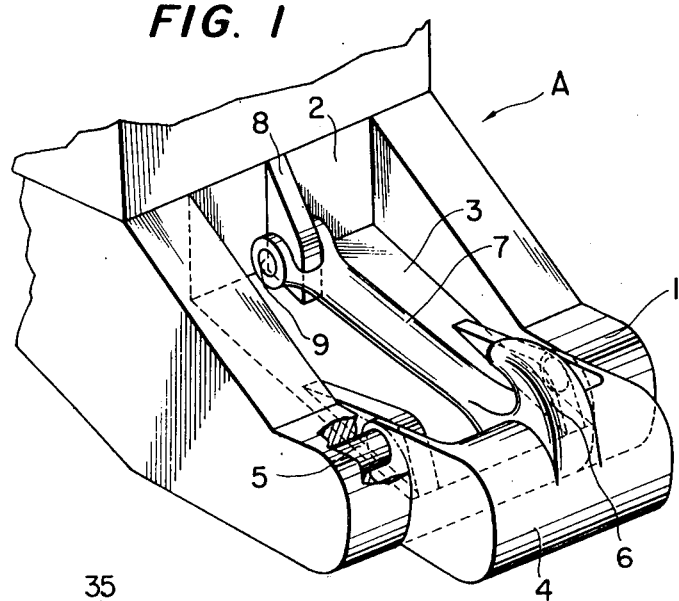
FIG. 1 is a perspective view of a forward coupling means for a push-pull coupling according to one embodiment of the present invention.
Figure 2:
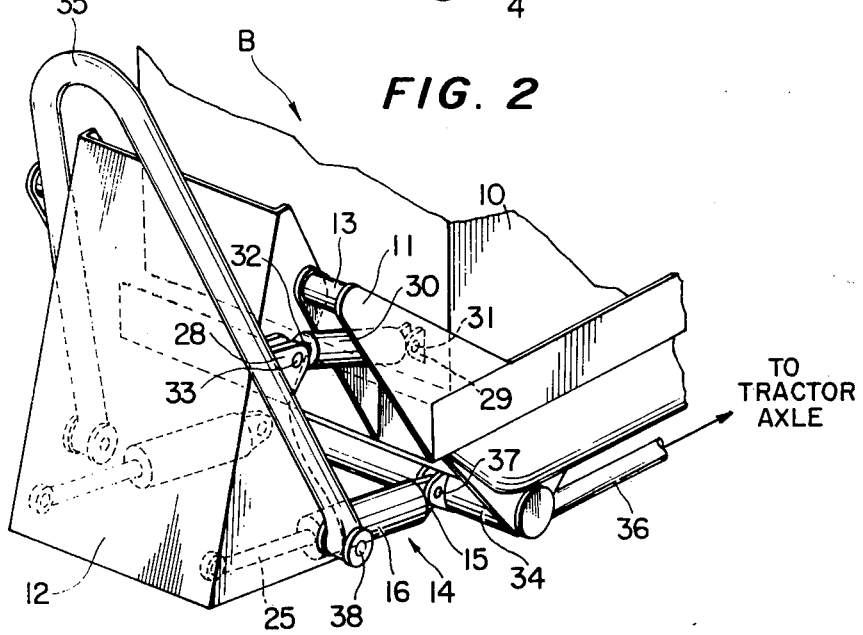
FIG. 2 is a perspective view of a rearward coupling means for the same.

The present invention will now be described in detail below with reference to FIGS. 1 to 6.

Reference numeral 1 denotes a push block fixedly secured to the tail end portion 2 of a forward scraper A. The push block 1 has a recess 3 formed in the central part thereof. A push block 4 used for both push and pull operations is mounted within the recess 3. The push block 4 is pivotally connected to the push block 1 by means of pins 5. A pulling hook 6 extends from the central upper part of the push block 4. The push block 4 has a guide 7 fixedly secured thereto, and the guide 7 is pivotally connected by means of a pin 9 to a bracket 8 fixedly secured to the tail end portion 2.

Figure 3:
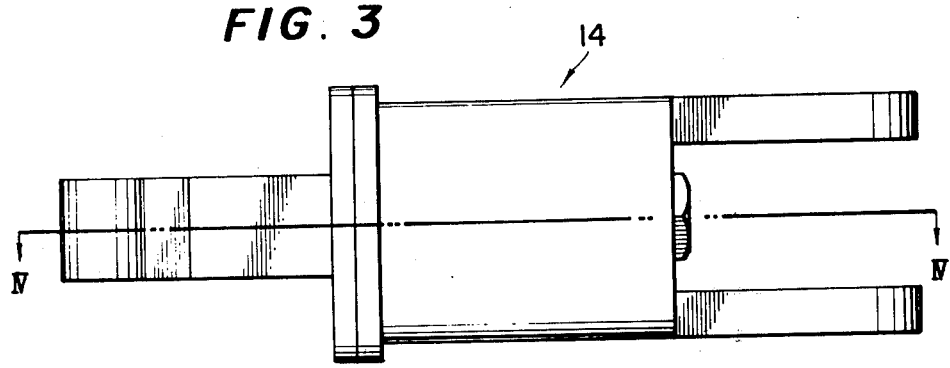
FIG. 3 is a plan view of a shock absorber.
Figure 4:
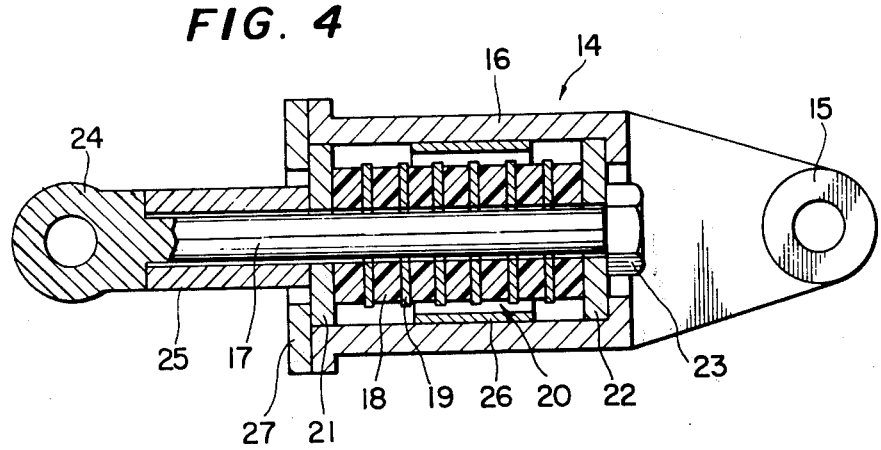
FIG. 4 is a sectional view of the shock absorber taken along the line IV — IV of FIG. 3.
Figure 5:
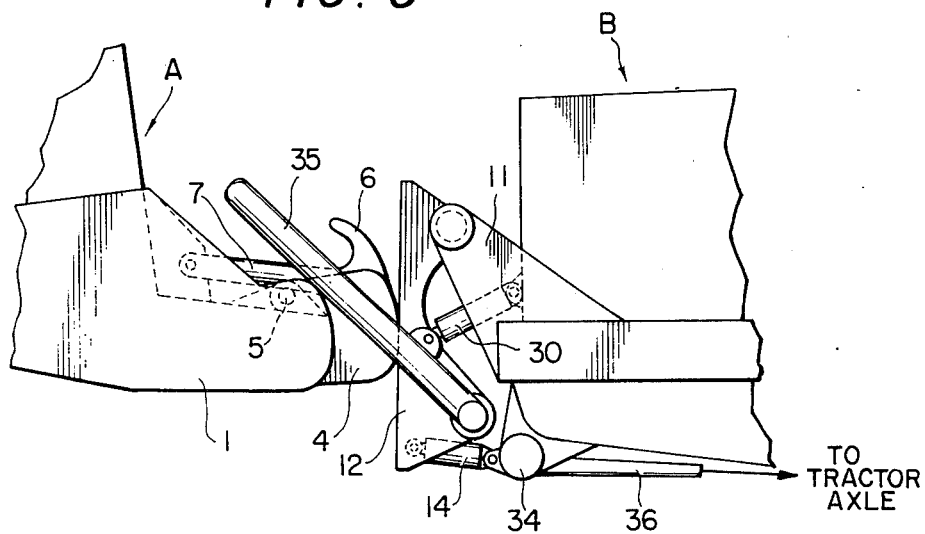
FIG. 5 is a side view in elevation of the push-pull coupling with the parts illustrated in pushing operation.

Reference numeral 10 represents a tractor for rearward scraper B in general. On the left and right sides of the front end of the tractor 10 there extend brackets 11. The upper part of a push block 12 is pivotally connected to the brackets 11 by means of pins 13. On the front lower part of the tractor 10 there is fixed a reinforcing member 34 having brackets. Connecting rings 15 of two-way shock absorbers 14 are connected respectively to the brackets of the reinforcing member 34 by means of pins 37. Each of the two-way shock absorbers 14 comprises, as shown in FIGS. 3 and 4, a cylinder 16 having a connecting ring 15, and a rod 17 being inserted in the cylinder 16.

The rod 17 extends through a shock absorber member 20 comprising a plurality of rubber rings 18 and steel plates 19 alternately disposed. Mounted against the forward and rearward ends of the shock absorber member 20 are retainers 21 and 22. A nut 23 is threadably engaged with the rearward end of the rod 17. A spacer 25 is interposed between the retainer 21 and connecting ring 24 of the rod 17, and a spacer 26 is loosely and slidably inserted within the cylinder 16. A cover member 27 is secured to the forward end of the cylinder 16. The respective connecting rings 24 of the rods 17 of the thus contructed two-way shock absorber 14, are connected by means of pins to the left and right sides of the lower part of the push block 12. The ends of a bail 35 are pivotally connected by means of pins 38 to the left and right sides of the lower part of the push block 12. Brackets 28 extend from the bail 35. Each one of brackets 29 on the left and right sides of the front end of the tractor 10 is connected by means of a pin 31 to one end of a hydraulic cylinder 30 having a rod 32 therein. The rod 32 of each hydraulic cylinder 30 is connected to the bracket 28 by means of a pin 33. The reinforcing member 34 is operatively connected through a rod 36 to of the tractor 10.

When the forward scraper A is pushed by the rearward scraper B, the push block 12 of the latter is brought into contact with the push block 4 of the former so that the bail 35 pushes the push block 1 through the action of the hydraulic cylinders 30. The shock took place at the time of contact can be absorbed by the contraction of the two-way shock absorbers 14. Stating more specifically, each of the two-way shock absorbers 14 is subjected to the force in a direction of the contraction thereof so that the shoulder portion, not numbered of rod 17 biasis the spacer 25 and the retainer 21 and compresses the shock absorber member 20 until the retainer 21 is brought into contact with the retainer 22 by the interposition of the spacer 26 therebetween.

Figure 6:
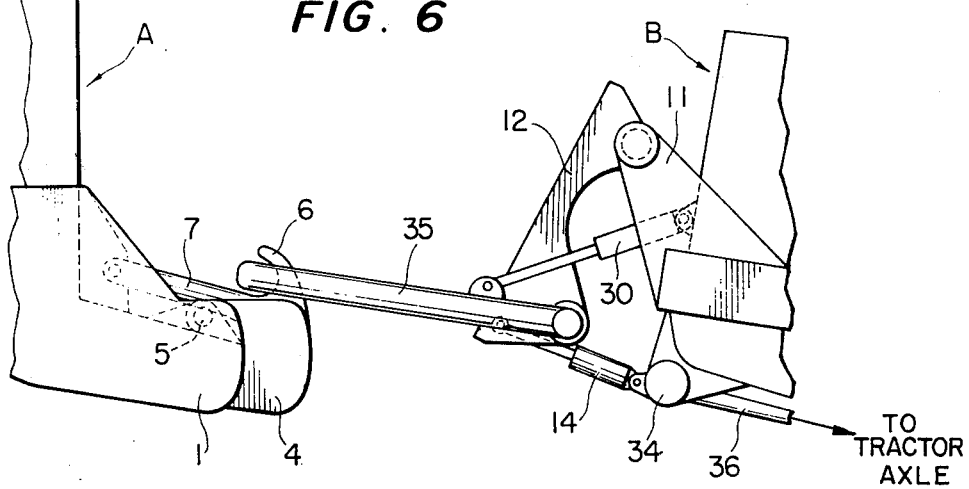
FIG. 6 is a side view in elevation of the push-pull coupling with the parts in pulling operation.

When the pushing operation is completed and the forward scraper A moves the bowl upwards and the tail portion 2 thereof is moved downwards as shown in FIG. 6, the bail 35 is urged against the guide 7 by the action of the hydraulic cylinders 30 and slides along the guide 7 and is engaged with the pulling hook 6. The shock caused by the contact at that time is absorbed by the extension of two-way the shock absorbers 14. Stated more particularly, each of the two-way shock absorbers 14 is subjected to a force in the extending direction thereof, so that nut 23 threadably engaged with the rod 17 biased the retainer 22 and compresses the shock absorber member 20 until the retainer 22 is brought into contact with the retainer 21 by the interposition of the spacer 26 therebetween.

The tractive force of the forward scraper A is transmitted through the pulling hook 6, bail 35, the two-way shock absorbers 14, the reinforcing member 34 and the rods 36 to the axle, thereby pulling the latter. In such force balancing condition, the tractive force of the forward scraper A can be effectively transmitted to the axle of the rearward scraper B in such a manner that the tractive force is hardly transmitted to the tractor frame of the rearward scraper thereby preventing the tractor frame from being subjected to a bending stress or deformation.

As mentioned hereinabove, the push-pull coupling according to the present invention comprises a push block 4 adapted to be fixedly secured to a forward scraper A and having a pulling hook 6 projecting therefrom, a push block 12 pivotally connected through brackets 11 to the front end of tractor 10 of rearward scraper B, a reinforcing member 34 adapted to be mounted on the front end of the tractor 10 and connected through the rods 36 to the axle of the tractor 10, the lower part of said push block 12 being connected through a plurality of two-way shock absorbers 14 to the reinforcing member 34, a bail 35 adapted to be pivotally connected to the lower part of the push block 12, and hydraulic cylinders 30 connected to the tractor 10 for effecting tilting movement of the bail 35.

Therefore, the tractive force of the forward scraper A is transmitted through the pulling hook 6, the bail 35, the two-way shock absorbers 14 to the reinforcing member 34. Thus, most of the tractive force of the forward scraper is transmitted through the rods 36 to pull of the two-way rearward scraper B, and does not affect the tractor frame of the rearward scraper B so that the tractive force can be effectively transmitted to the axle without bending the tractor frame. Further, the two-way shock absorbers 14 can absorb the shock loads caused in the course of pushing operation or pulling operation.

It is to be understood that the above description is by way of example only, and that details for carrying out the invention into effect may be varied without departing from the scope of the invention claimed.

What is claimed is:

1. A push-pull coupling for a tandem arrangement of earthmoving scraper units comprising:
    a first push block fixedly secured to the tail end portion of a forward scraper unit and having a pulling hook projecting therefrom,
    a second push block pivotally mounted at the upper end thereof to the front end of a tractor of a rearward scraper unit for contact said first push block to establish a pushing relationship between the scraper units, said second push block having means mounted thereon for engaging said pulling hook in such a manner as to be hooked thereby to establish a pulling relationship between the scraper units, and
    at least two sets of two-way, compressive shock absorber means, connected respectively between the lower part of said second push block of said rearward scraper unit and a reinforcing member secured to a tractor framework of said rearward scraper said rearward unit, each of said two-way compressive shock absorbing means being dually effective to lessen shocks between said units both when said forward scraper unit is pushing said forward scraper unit and when said rearward scraper unit is pulling said forward scraping unit.

2. The push-pull coupling as claimed in claim 1, wherein each of said two-way shock absorber means comprises:
    a. a cylinder section having at one end thereof a first connecting ring pivotally connected through a pin and a bracket means to said reinforcing member,
    b. a rod inserted into said cylinder section and having at one end thereof positioned on the opposite side to said first connecting ring a second connecting ring connected through a pin and a bracket means to said second push block,
    c. a shock absorbing member mounted on said rod and comprising a plurality of annular rubber rings and a plurality of annular steel plates, both the rubber rings and steel plates being alternately disposed with respect to each other,
    d. a pair of annular retainers mounted on said rod and respectively located at each end of said shock absorbing member, said retainers being slidably disposed within said cylinder section,
    e. a first spacer mounted on said rod and interposed between one of said retainers and said second connecting ring of said rod,
    f. a nut threadingly engaged with the other end of said rod for holding said shock absorbing member and said retainers between said spacer and said nut,
    g. a second spacer slidably disposed within said cylinder section and having a length shorter than the distance defined between said pair of annular retainers, and
    h. an annular cover member fixedly secured to the end face of said cylinder section at the other end thereof for preventing said rod section from being dislodged from said cylinder section.

* * * * *